(12) United States Patent
Chen et al.

(10) Patent No.: US 10,632,907 B2
(45) Date of Patent: Apr. 28, 2020

(54) VEHICLE LAMP ASSEMBLY FOR THE PASSENGER COMPARTMENT HAVING A FIRST AND SECOND OPTIC FOR FUNCTIONAL LIGHTING

(71) Applicant: Ford Global Technologies, LLC, Dearborn, MI (US)

(72) Inventors: Linsheng Chen, Novi, MI (US); Steven J. Antilla, Brighton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 16/126,278

(22) Filed: Sep. 10, 2018

(65) Prior Publication Data

US 2020/0079284 A1  Mar. 12, 2020

(51) Int. Cl.
| | | |
|---|---|---|
| *B60Q 3/74* | (2017.01) |
| *B60Q 3/82* | (2017.01) |
| *B60R 13/02* | (2006.01) |
| *F21V 7/04* | (2006.01) |
| *F21K 9/68* | (2016.01) |
| *F21V 13/04* | (2006.01) |
| *B60Q 3/60* | (2017.01) |
| *F21V 5/00* | (2018.01) |
| *F21V 5/04* | (2006.01) |
| *B60Q 3/54* | (2017.01) |
| *B60Q 3/30* | (2017.01) |
| *F21V 29/76* | (2015.01) |
| *F21Y 115/10* | (2016.01) |
| *F21V 29/503* | (2015.01) |
| *F21W 106/00* | (2018.01) |

(52) U.S. Cl.
CPC .............. *B60Q 3/60* (2017.02); *B60Q 3/30* (2017.02); *B60Q 3/54* (2017.02); *B60Q 3/82* (2017.02); *F21V 5/008* (2013.01); *F21V 5/04* (2013.01); *F21V 29/503* (2015.01); *F21V 29/763* (2015.01); *F21W 2106/00* (2018.01); *F21Y 2115/10* (2016.08)

(58) Field of Classification Search
CPC ... B60Q 3/60; B60Q 3/54; B60Q 3/82; B60Q 3/30; F21V 5/008; F21V 5/04; F21V 29/763; F21V 29/503; F21Y 2115/10; F21W 2106/00
See application file for complete search history.

(56) References Cited

U.S. PATENT DOCUMENTS

| | | | | |
|---|---|---|---|---|
| 5,582,474 A | * | 12/1996 | Van Order | ............. B60Q 3/217 359/19 |
| 6,099,156 A | * | 8/2000 | Jenkins | ................. B29C 45/561 362/511 |
| 7,580,192 B1 | | 8/2009 | Chu et al. | |
| 9,676,155 B2 | | 6/2017 | Iatan et al. | |
| 2004/0264188 A1 | | 12/2004 | Tazawa et al. | |

(Continued)

*Primary Examiner* — Tracie Y Green
(74) *Attorney, Agent, or Firm* — David Coppiellie; Price Heneveld LLP

(57) ABSTRACT

A vehicle lamp assembly including a lens operably coupled with a substrate is provided herein. A light source may be disposed between the lens and the substrate. A first optic may be disposed on the lens and configured to direct light emitted from the light source in a downward direction. A second optic may be disposed on the first optic and configured to disperse light emitted from the light source.

17 Claims, 8 Drawing Sheets

(56) References Cited

U.S. PATENT DOCUMENTS

| | | | |
|---|---|---|---|
| 2011/0164429 A1* | 7/2011 | Heym | B60Q 3/44 |
| | | | 362/471 |
| 2014/0185310 A1* | 7/2014 | Lisowski | F21S 43/14 |
| | | | 362/516 |
| 2014/0321139 A1* | 10/2014 | Bungenstock | F21S 43/145 |
| | | | 362/511 |
| 2015/0138820 A1* | 5/2015 | Salter | B60K 37/06 |
| | | | 362/510 |
| 2015/0184823 A1 | 7/2015 | Ladenburger | |
| 2017/0241608 A1 | 8/2017 | Gousset-Rousseau | |
| 2017/0308173 A1* | 10/2017 | Youn | G06F 3/0421 |
| 2017/0317251 A1* | 11/2017 | Sweegers | H01L 33/46 |
| 2017/0318635 A1* | 11/2017 | Dong | H05B 33/0869 |
| 2019/0064534 A1* | 2/2019 | Chou | G02B 27/0955 |

\* cited by examiner

US 10,632,907 B2

VEHICLE LAMP ASSEMBLY FOR THE PASSENGER COMPARTMENT HAVING A FIRST AND SECOND OPTIC FOR FUNCTIONAL LIGHTING

FIELD OF THE INVENTION

The present disclosure generally relates to vehicle lighting assemblies that may be positioned within a vehicle passenger compartment.

BACKGROUND OF THE INVENTION

Vehicle lighting applications continue to grow in popularity. Accordingly, a lamp assembly that may be integrated into a vehicle compartment is provided herein that is operable to provide functional lighting as well as impart a stylistic element to the vehicle.

SUMMARY OF THE INVENTION

According to one aspect of the present disclosure, a vehicle lamp assembly is provided herein. The vehicle lamp assembly includes a lens operably coupled with a substrate. A light source is disposed between the lens and the substrate. A first optic is disposed on the lens and configured to direct light emitted from the light source in a downward direction. A second optic is disposed on the first optic and is configured to disperse light emitted from the light source.

According to another aspect of the present disclosure, a vehicle lamp assembly is provided herein. The vehicle lamp assembly includes a lens operably coupled with a substrate and defining a latitudinal axis offset from a floor surface of a cargo compartment. A light source is disposed between the lens and the substrate. A first optic is disposed on the lens and is configured to direct light emitted from the light source in a downward direction.

According to yet another aspect of the present disclosure, a vehicle lamp assembly is provided herein. The vehicle lamp assembly includes a substrate defining a cavity. A lens is positioned at least partially within the cavity. A light source is disposed between the lens and the substrate. A first optic is disposed on the lens and is configured to direct light emitted from the light source in a downward direction.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
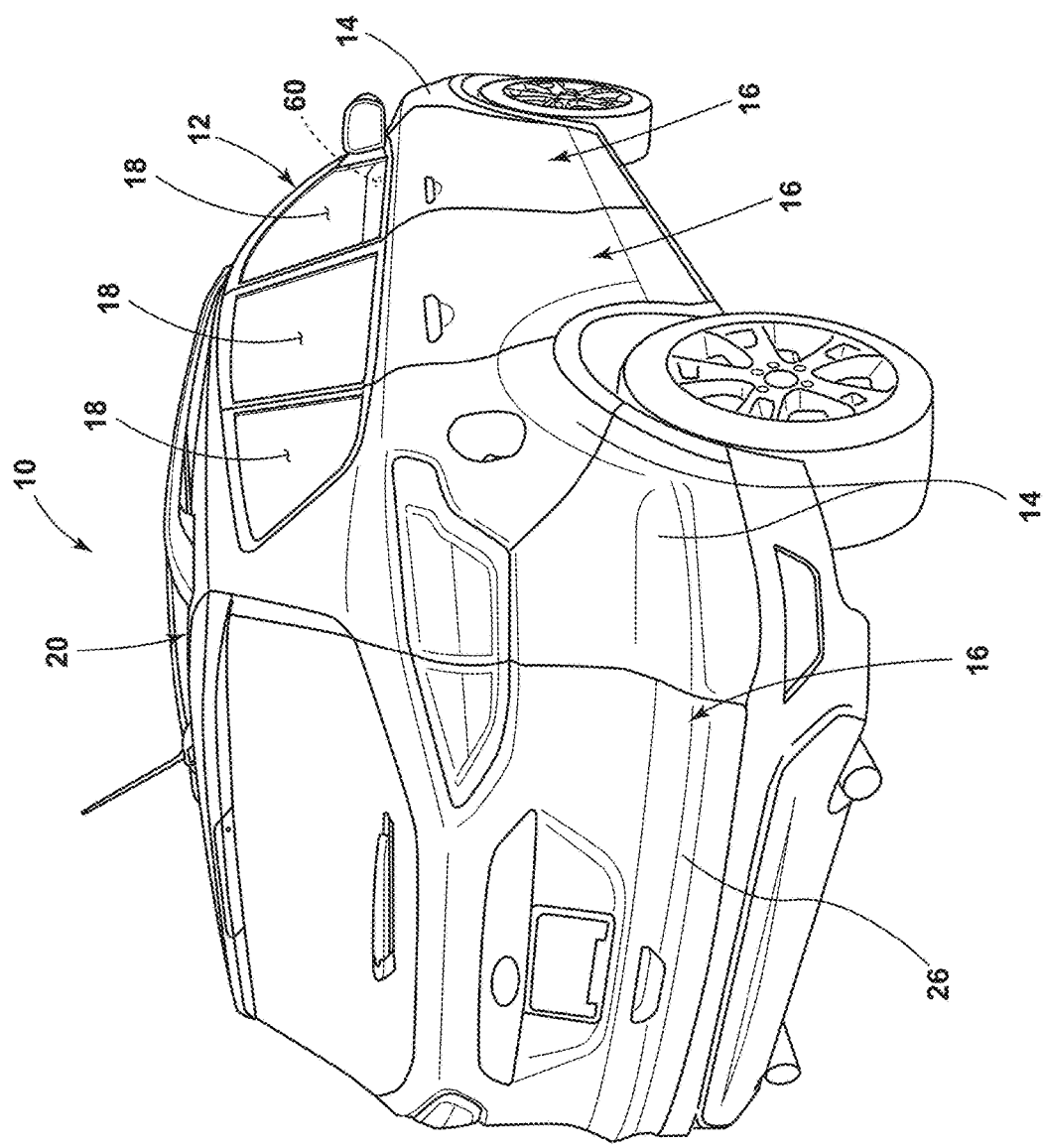
FIG. 1 is a rear perspective view of a vehicle with a rear door in a closed position, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle lamp assembly including a lens operably coupled with a substrate. A light source may be disposed between the lens and the substrate. A first optic may be disposed on the lens and configured to direct light emitted from the light source in a downward direction. A second optic may be disposed on the first optic and configured to disperse light emitted from the light source. The lens may be a total internal reflection lens that includes a body having a refraction-collimating portion on a rear portion of the body, a total reflection portion outwardly of the refraction-collimating portion, and an emitting surface on a forward portion of the body.

Figure 2:
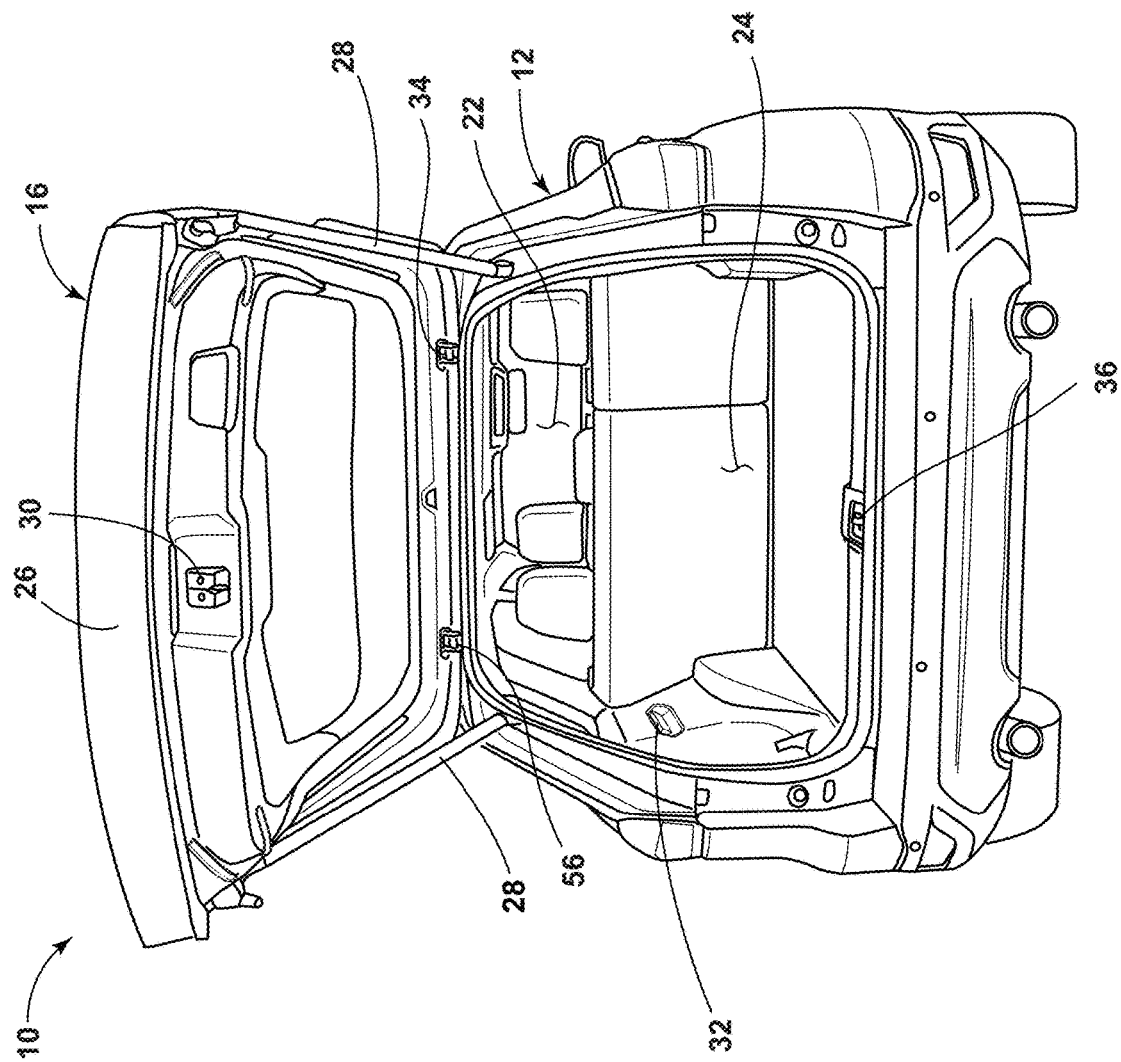
FIG. 2 is a rear perspective view of the vehicle with the rear door in an open position and a lamp assembly positioned within a cargo compartment, according to some examples.

With reference to FIGS. 1 and 2, a vehicle 10 generally includes a body 12, a chassis, and a powertrain driving road wheels to move the vehicle 10. The body 12 generally includes one or more body panels 14, doors 16, windows 18, and a roof 20 that generally define a passenger compartment 22 of the vehicle 10. One or more of the doors 16 may provide access to the passenger compartment 22 and/or a cargo compartment 24. For example, the cargo compartment 24 may be accessible through a rear door 26, which may be configured as a hatch. The rear door 26 is movably attached to one or more of the proximately disposed body panels 14 of the vehicle 10 and can be moved from a closed position (FIG. 1) to an open position (FIG. 2). It will be appreciated that the open position may be any position that is different from the closed position without departing from the scope of the present disclosure. Accordingly, the rear door 26 may be disposed in a plurality of open positions, including a wide array of intermediate open positions and a fully open position. It will be appreciated that any other movable panel may be used in addition to or in lieu of the hatch without departing from the teachings of the present disclosure.

In some examples, gas springs 28 may assist in movement of the rear door 26 when a latch 30 is released. As will be described in detail below, a lamp assembly 32 may be used in conjunction with the rear door 26 to provide illumination proximately to the cargo compartment 24. It will be appreciated that the lamp assembly 32 described herein may be used on any portion of any type of vehicle 10 and/or outside of the vehicle 10 applications without departing from the spirit of the present disclosure.

Referring to FIGS. 1 and 2, the hatch is connected to the body 12 of the vehicle 10 by one or more hinges 34. Moreover, the hatch may be selectively retained in a closed position by a latch 30 engaging a striker 36. When moved between the closed and open positions, the door 16 may rotate about a horizontal axis, a vertical axis, and/or any other oriented axis. The lamp assembly 32 may be disposed within the cargo compartment 24 and emanate light when the rear door 26 is placed in the open position. However, it will be appreciated that the lamp assembly 32 may additionally and/or alternatively emanate light in response to any other activation signal without departing from the scope of the present disclosure.

Figure 3:
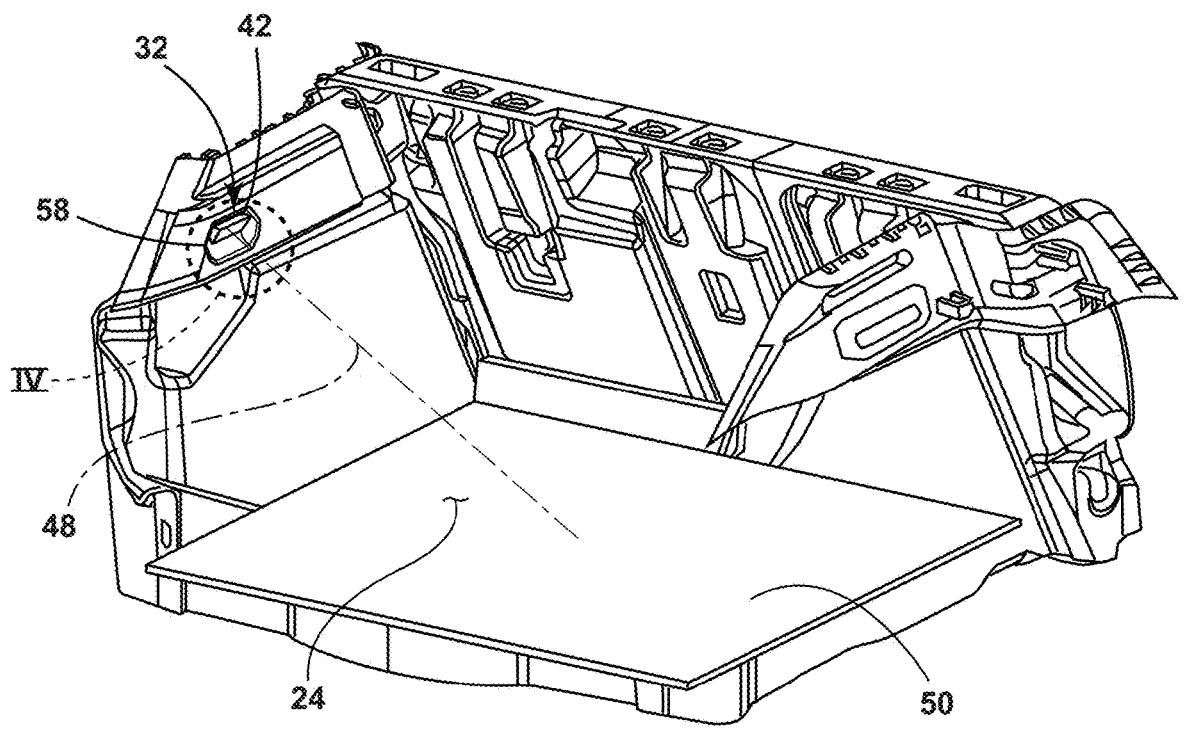
FIG. 3 is an exemplary side perspective view of the cargo compartment having the lamp assembly therein, according to some examples.
Figure 4:
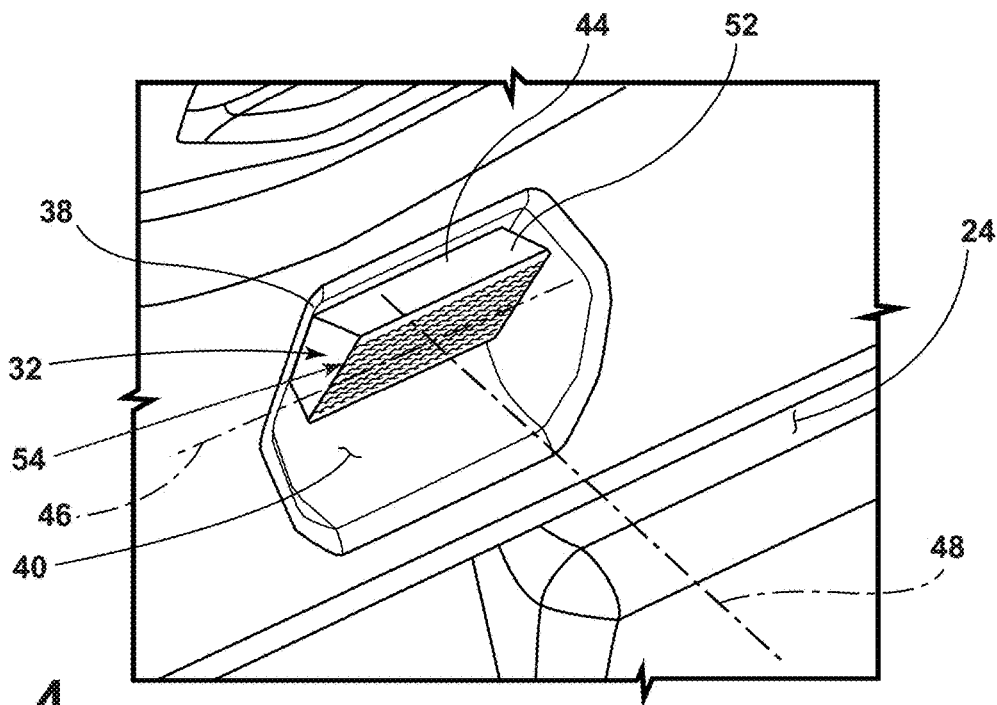
FIG. 4 is an enhanced view of area IV of FIG. 3.

Referring to FIGS. 3 and 4, the lamp assembly 32 may be integrated into a trim member 38 disposed within the cargo compartment 24 of the vehicle 10. The trim member 38 may confer any aesthetic appearance and may be formed from any practicable material, such as a polymeric, an elastomeric, a fabric, a metal, any combinations thereof, etc. material without departing from the scope of the present disclosure.

The trim member 38 may define a cavity 40 and at least a portion of the lamp assembly 32 may be disposed within the cavity 40. In some examples, the lamp assembly 32 may include a lens 42 that protrudes from the trim member 38 in an upper portion of the cavity 40. Further, in some instances, the lens 42 may have a body 44 defining a longitudinal axis 46 and a latitudinal axis 48. The longitudinal axis 46 may extend in a perpendicular direction to that of the latitudinal axis 48. In some instances, the latitudinal axis 48 may be offset and/or directed towards a portion of a floor surface 50 of the cargo compartment 24. Alternatively, in other words, the latitudinal axis 48 of the lens 42 may be offset from the floor surface 50. A bottom portion of the cavity 40 may be free of obstacles such that light emitted from the lamp assembly 32 may illuminate any portion of the floor surface 50 of the cargo compartment 24.

Moreover, a top portion 52 of the lens 42 may extend further into the cargo compartment 24 than a portion of the trim member 38 disposed proximate the lens 42. Additionally, one or more side portions 54 of the lens 42 may also extend inwardly of the trim member 38. The extension of the lens 42 toward the cargo compartment 24 and outwardly of the cavity 40 may allow for additional light dispersion of light emanated from the lamp assembly 32. Moreover, it should be appreciated that the lens 42 may have an outer portion that may be retrofitted into a predefined lamp pocket within a cargo compartment 24. Moreover, by having the latitudinal axis 48 of the lens 42 directed toward the floor surface 50, glare from the lamp assembly 32 may be reduced or removed from a passenger portion of the vehicle 10, which may be forward of the cargo compartment 24.

Figure 5:
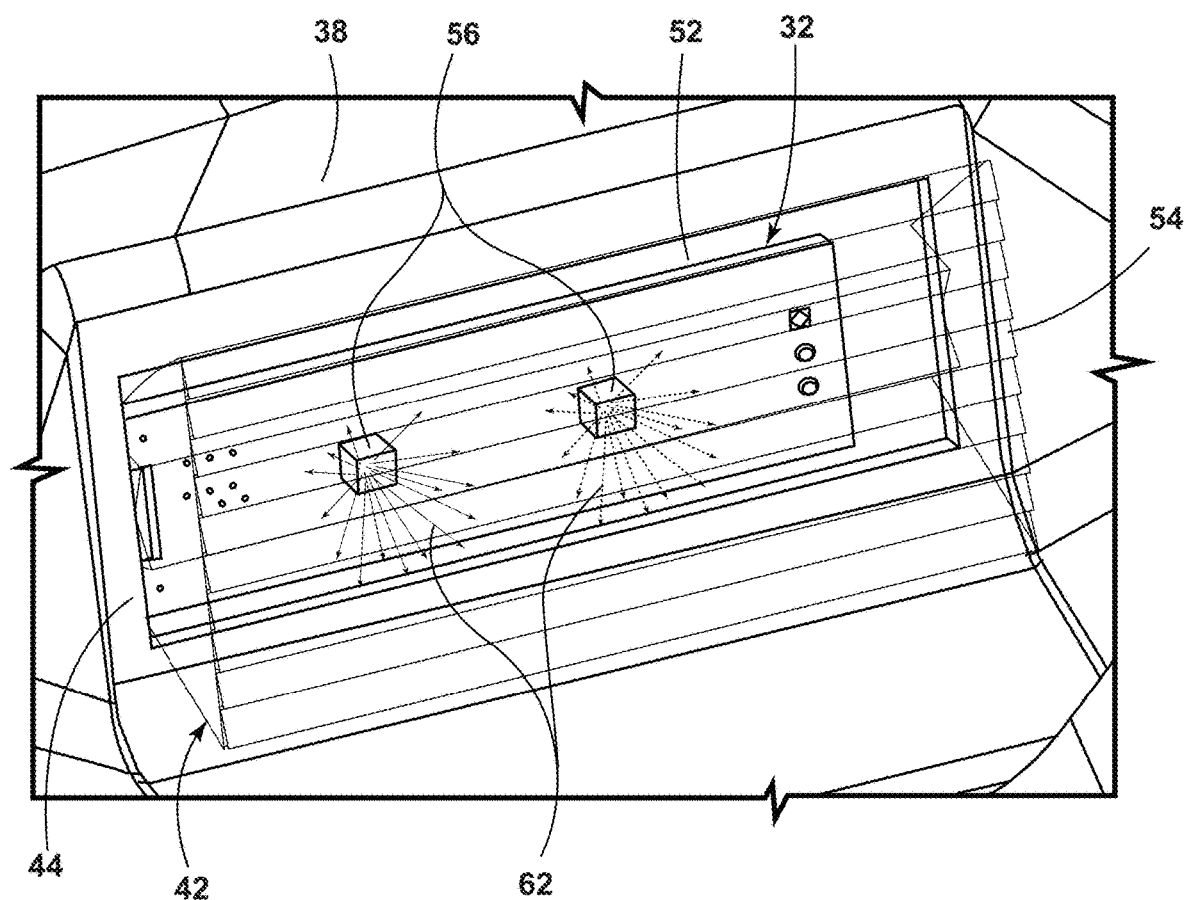
FIG. 5 is a front perspective view of the lamp assembly disposed within a trim member, according to some examples.
Figure 6:
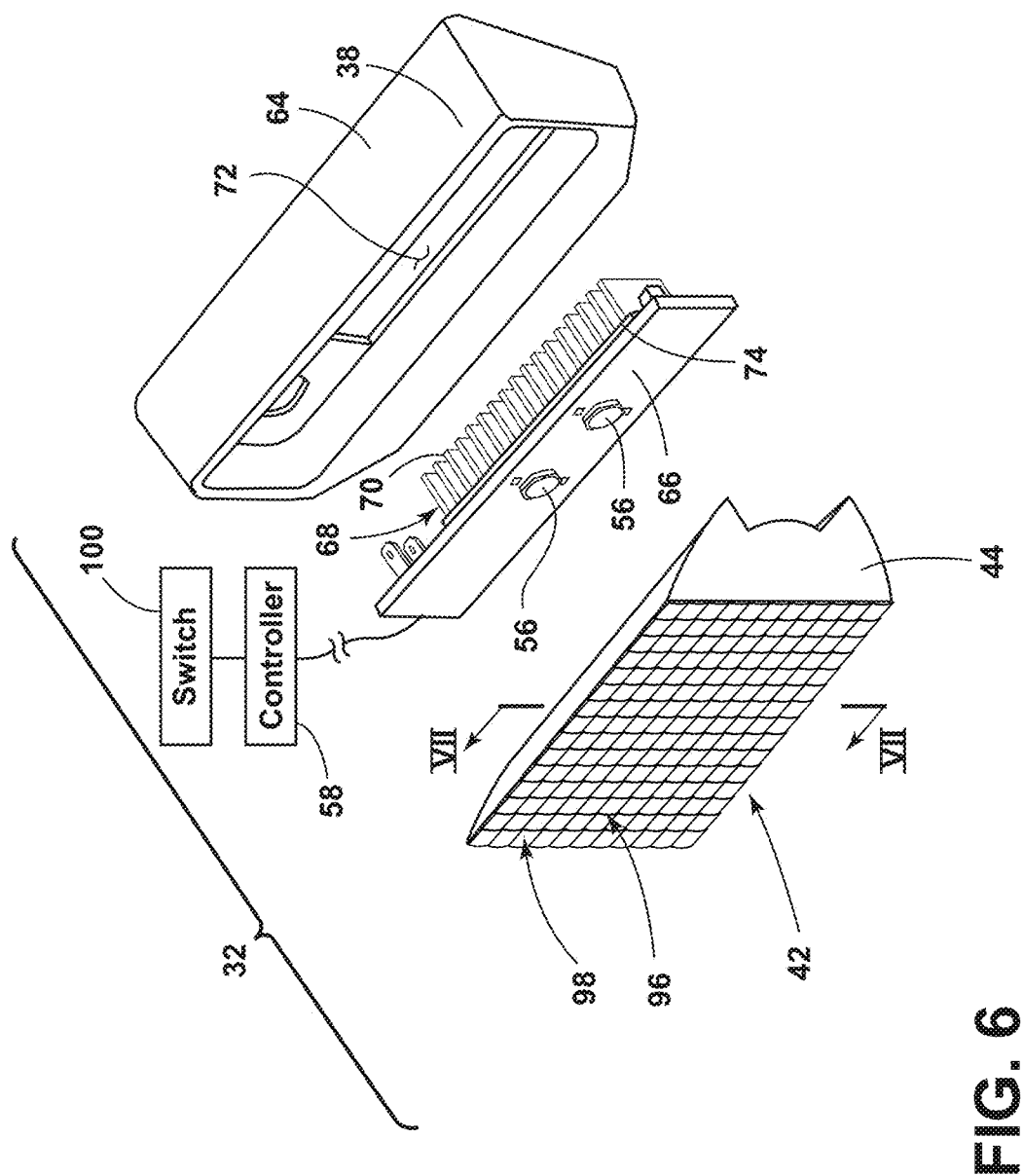
FIG. 6 is a front exploded view of the lamp assembly, according to some examples.

Referring to FIGS. 5 and 6, the lamp assembly 32 includes one or more light sources 56 electrically coupled with a controller 58. The controller 58 can provide the lamp assembly 32 with generated pulse width modulated (PWM) signals to produce a corresponding light intensity and/or light color. Alternatively, the controller 58 can directly drive the current to the lamp assembly 32 to accomplish the same variations in intensity and/or light color. In some examples, the vehicle 10 includes a light sensor 60 (FIG. 1) that may be utilized for varying the intensity of emitted light 62 emanated from the lamp assembly 32. The light sensor 60 detects ambient lighting conditions, such as whether the vehicle 10 is in day-like conditions (i.e., higher light level conditions) and/or whether the vehicle 10 is in night-like conditions (i.e., lower light level conditions). The light sensor 60 can be of any suitable type and can detect the day-like and night-like conditions in any suitable fashion. According to some examples, the colors of light and/or intensities of the emitted light 62 from the lamp assembly 32 may be varied based on the detected conditions. The light sensor 60 may be integrated into the vehicle 10 or into the lamp assembly 32.

Referring to FIGS. 5 and 6, the lamp assembly 32, according to some examples, includes a rear housing 64 for being fastened to a component of the vehicle 10 and/or the trim component may form the rear housing. The rear housing 64 supports a circuit board, which may be configured as a printed circuit board (PCB) 66, oriented along the rear housing 64 and having control circuitry including drive circuitry for controlling activation and deactivation of the plurality of light sources 56. The PCB 66 may be any type of circuit board including, but not limited to, any flexible PCB and/or rigid PCB.

The PCB 66 is operably coupled with the controller 58 that is configured to receive various inputs and control the lamp assembly 32 by applying signals to the light sources 56 within the lamp assembly 32. The controller 58 may be disposed within the lamp assembly 32 and/or within the vehicle 10. The controller 58 may include a microprocessor and memory, according to some examples. It should be appreciated that the controller 58 may include control circuitry such as analog and/or digital control circuitry. Logic is stored within the memory and executed by the microprocessor for processing the various inputs and controlling each of the plurality of light sources 56, as described herein. The inputs to the controller 58 may include a door position signal, a sensor signal, a door unlatch signal, a switch activation signal, and/or any other signal.

The controller 58 may include any combination of software and/or processing circuitry suitable for controlling the various components of the lamp assembly 32 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

With respect to the examples described herein, the light sources 56 may each be configured to emit visible and/or non-visible light. In various examples, the light sources 56 may be fluorescent lights, light emitting diodes (LEDs), organic LEDs (OLEDs), polymer LEDs (PLEDs), laser diodes, quantum dot LEDs (QD-LEDs), solid-state lights, a hybrid of these or any other similar device, and/or any other form of light source. Further, various types of LEDs are suitable for use as the light source 56 including, but not limited to, top-emitting LEDs, side-emitting LEDs, and others. Moreover, according to various examples, multicolored light sources, such as Red, Green, and Blue (RGB) LEDs that employ red, green, and blue LED packaging may be used to generate various desired colors of light output from a single light source, according to known light color mixing techniques.

With further reference to FIGS. 5 and 6, the light sources 56, while producing emitted light 62, also emit heat. As heat is emitted from the light sources 56, a heatsink 68 captures at least a portion of this heat. The captured heat is temporarily retained within elongated members 70 of the heatsink 68. The captured heat within the heatsink 68 migrates to areas that have a lower temperature than the heatsink 68. As such, the heatsink 68, after absorbing heat from the light sources 56, exchanges, or transfers heat to cooler regions around the vehicle 10. In some examples, the rear housing 64 may define a void 72 through which the heatsink 68 may extend.

In various examples, the elongated members 70 of the heatsink 68 can extend generally perpendicular to a back portion 74 of the heatsink 68. In such an example, the elongated members 70 can be linear or can include various angled and/or curved portions. It is contemplated that, in various instances, the elongated members 70 can extend in an angled configuration or a curved configuration, or both, relative to the back portion 74 of the heatsink 68. It is further contemplated that each elongated member 70 can have configurations that can include, but are not limited to, linear, curved, angled, and trapezoidal, among other configurations. Additionally, various cross members can be included that extend across the elongated members 70 to add structure to the elongated members 70 and also add surface area through which heat can be transferred from the lamp assembly 32. It is also contemplated that the elongated members 70 may not have a consistent length. Such configurations may include a triangular profile, a trapezoidal profile, a curved profile, an irregular profile, among other similarly shaped profiles. Various examples of the heatsink 68 may also include more than one row of elongated members 70, such as an inner layer and outer layer of elongated members 70. In the various examples, the heatsink 68 can be made of various materials that have a high thermal conductivity. Such materials can include but are not limited to, aluminum, aluminum alloys, copper, composite materials that incorporate materials having a high thermal conductivity, combinations thereof, and other materials that are at least partially thermally conductive.

With further reference to FIGS. 5 and 6, the lens 42 may be configured in any manner, and in some examples, may be configured as a total internal reflection lens 42. First and/or second optics 96, 98 may be disposed on the lens 42 to further direct light 62 emitted from the light sources 56 in a predefined direction to illuminate the cargo compartment 24.

Referring still to FIGS. 5 and 6, in some instances, a switch assembly 100 may be disposed proximate the lamp assembly 32 and/or otherwise disposed within the vehicle 10, which may be configured as a proximity switch. The proximity switch provides a sense activation field to sense contact or close proximity of an object, such as a person in relation to the proximity switch. It will be appreciated by those skilled in the art that any type of proximity switch can be used, such as, but not limited to, capacitive sensors, inductive sensors, optical sensors, temperature sensors, resistive sensors, the like, or a combination thereof. The switch assembly 100 may be used to detect a person and/or object proximate the lamp assembly 32 and alter the illumination sequence of the lamp assembly 32 based on whether a person and/or object is detected. Moreover, the switch assembly 100 may activate/deactivate the light sources 56, toggle the light sources 56 between the various illumination settings (i.e., selectively illuminate the various zones of the cargo compartment 24 and/or the passenger compartment 22), move the hatch between open and closed positions, and/or activate/deactivate any other feature of the vehicle 10. Moreover, it will be appreciated that some examples of the lamp assembly 32 may be free of a switch assembly 100 without departing from the teachings of the present disclosure.

Figure 7:
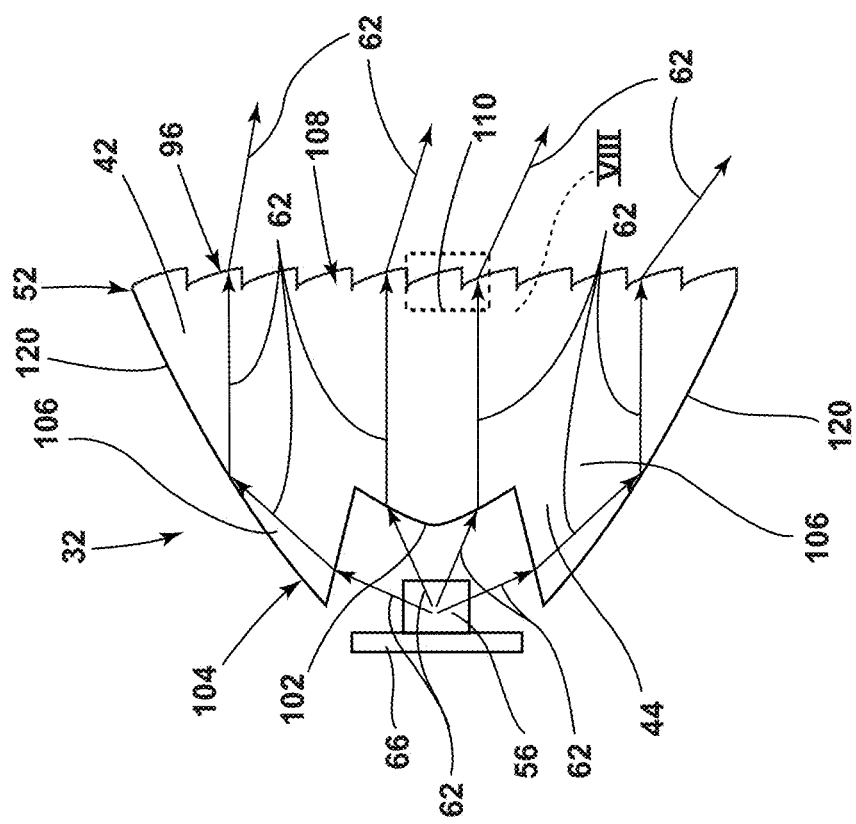
FIG. 7 is a cross-sectional view of a lens of the lamp assembly taken along the line VII-VII of FIG. 6.
Figure 8:
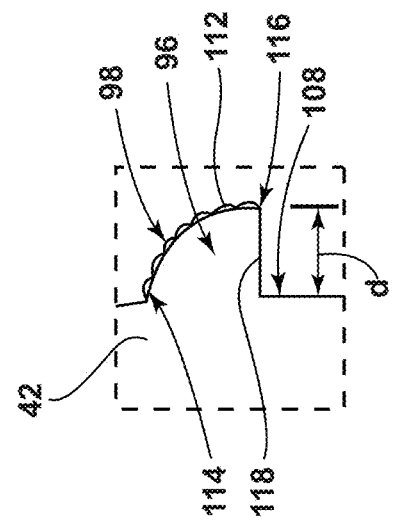
FIG. 8 is an enhanced view of area VIII of FIG. 7.
Figure 9:
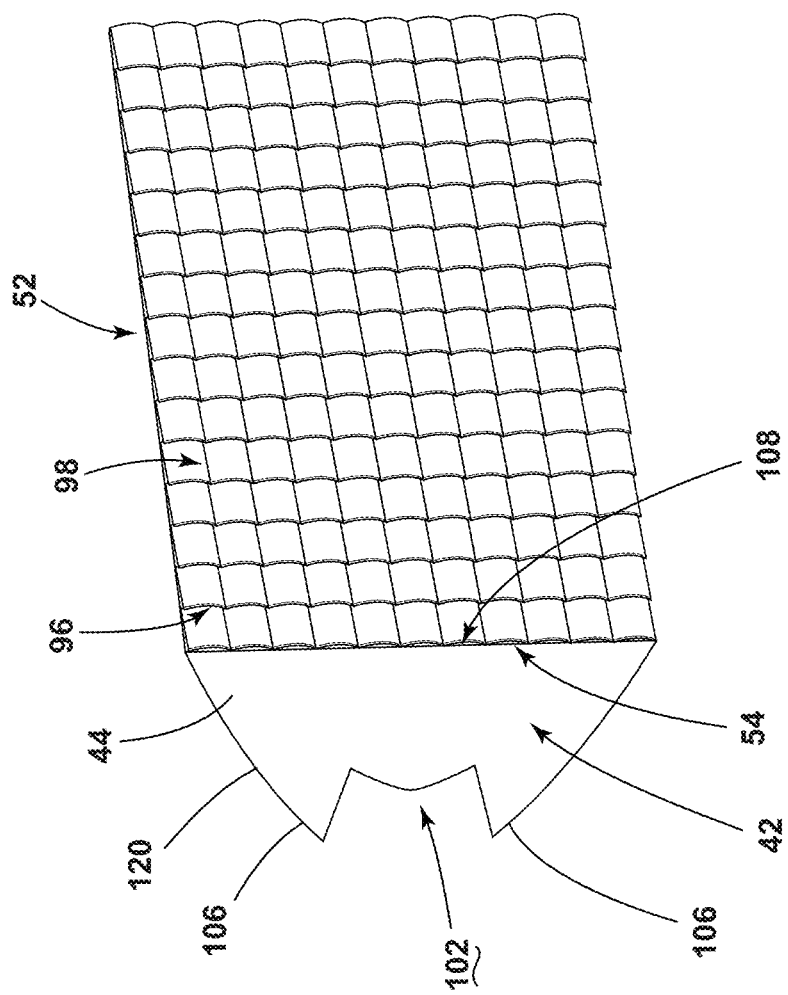
FIG. 9 is a front perspective view of the lens having first and second optics thereon, according to some examples.

Referring to FIGS. 7-9, in some examples, the body 44 of the lens 42 has a refraction-collimating portion 102 on a rear portion 104 of the body 44, a reflection portion 106 outwardly of the refraction-collimating portion 102, and an emitting surface 108 on a forward portion 110 of the body 44. First and/or second optics 96, 98 (FIG. 8) may be disposed, and possibly integrally disposed, on the emitting surface 108. The reflection portion 106 may include a pair of total reflection prisms that may be disposed around the outer portion of the collimating portion 102. Each reflection prism may have a reflection surface 120 that is configured to direct emitted light 62 towards the emitting surface 108.

A first optic 96 on the emitting surface 108 may include a wedge lens, or any other practicable lens, that is configured to direct light 62 downwardly. However, it will be appreciated that the emitted light 62 may be directed in any other direction without departing from the scope of the present disclosure. The wedge lens may include an upper curved surface 112. A first end portion 114 of the curved surface 112 may be terminated at the emitting surface 108 and a second end portion 116 of the curved surface 112 may be separated from the emitting surface 108 by a distance d. A planar surface 118 may be disposed between the second end portion 116 and the emitting surface 108.

In some examples, the second optic 98 may be disposed on the first optic 96 and/or otherwise disposed on the lens 42. The second optic 98 may be configured as a pillow optic and/or any other type of optic that is configured to disperse, concentrate, and/or otherwise direct light 62 emitted from the lamp assembly 32 therethrough in any desired manner. In some instances, the first optic 96 may be configured to direct light 62 downwardly and the second optic 98 may be configured to disperse light 62 throughout the cargo compartment 24. The first and/or second optic 96, 98 may also assist in blending light 62 emitted from multiple light sources 56 within the lamp assembly 32 thereby minimizing hotspots.

Referring still to FIGS. 7-9, in operation, emitted light 62 from the light source 56 emanates towards the collimating portion 102. The emitted light 62 is refracted by the collimating portion 102 and may project to the reflection portion 106. The projected light 62 is reflected by the reflection surface 120 after being refracted by the collimating portion 102 and projects forward towards the emitting surface 108. The light 62 collimated from the reflection portion 106 is subject to light distribution through the optics 96, 98 on the emitting surface 108. In some examples, the optics 96, 98 may be configured to direct the light 62 in a downward direction when the lamp assembly 32 is disposed within the vehicle 10. The downward directing of the emitted light 62 may illuminate at least a portion of the floor surface 50 of the cargo compartment 24. Moreover, by directing emitted light 62 towards the floor surface 50, the emitted light 62 may be substantially used in illuminating the floor surface 50 and/or the cargo compartment 24 with minimal wasted light. Additionally, by directing light 62 towards the floor surface 50, the emitted light 62 may be restricted from producing glare to passengers of the vehicle 10 that may be disposed vehicle forward of the cargo compartment 24.

Figure 10:
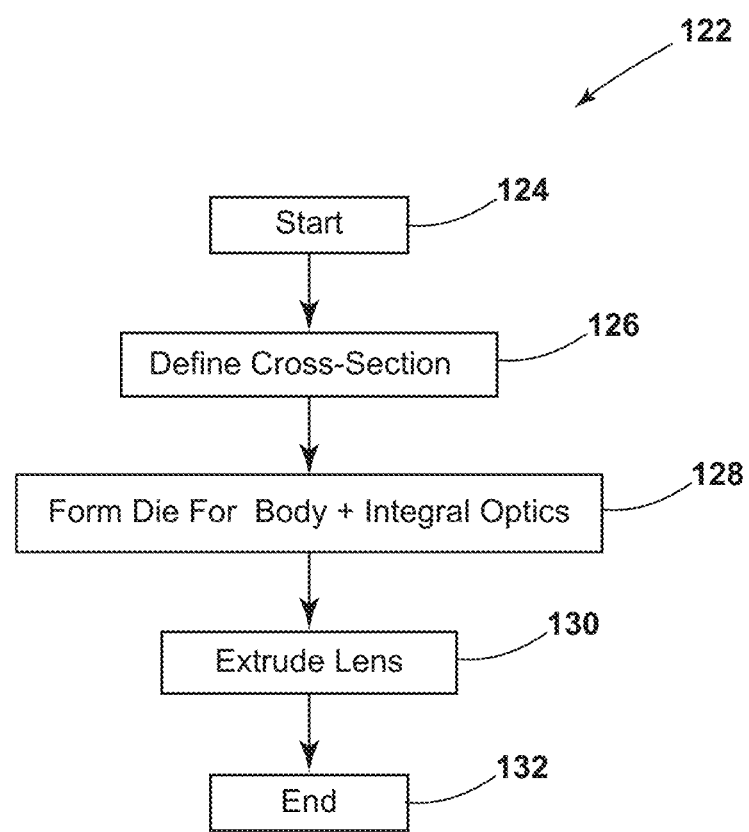
FIG. 10 is an exemplary method of manufacturing the lens, according to some examples.

Referring to FIG. 10, an illustrative method 122 for constructing the lens 42 in accordance with some examples of the lamp assembly 32 is shown. Because of the elongated shape of the lens 42, and the constant cross-section, the lens 42 can be constructed using an extrusion process. For example, an acrylic material or any other practicable material can be heated and pressed through a die corresponding to the lens 42. Once the material passes through the die, the material can be cooled to form the lens 42. In such examples, the method 122 can begin at step 124. At step 126, a cross-section (FIG. 7) for the lens 42 can be defined. For example, a lens 42 having a body 44 and integrally formed optics 96, 98 can be defined. Due to the optics 96, 98 longitudinal extension, in some examples, the optics 96, 98 may be integrally formed with the body 44. At step 128, a die corresponding to the defined cross-section can be created. The die can be constructed from any suitable material including, for example, a material having a higher melting temperature than the material used for the lens 42. At step 130, a lens material (e.g., a polymeric material, an elastomeric material, and/or any other practicable material) can be extruded through the die to form the lens 42. In some cases, the lens 42 can be constructed to have a specific length determined from requirements of a fixture. Alternatively, the lens 42 length can be one or more pre-defined modular lengths. The method 122 can then end at step 132.

It is to be understood that the steps shown in the method 122 of FIG. 10 are merely illustrative and that existing steps may be modified or omitted, additional steps may be added, and the order of certain steps may be altered. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are within the scope of the defined elements.

A variety of advantages may be derived from the use of the present disclosure. For example, use of the disclosed lamp assembly provides illumination to a cargo compartment, or any other compartment, of the vehicle. The lamp assembly may include a lens that is vertically offset to reduce glare outside of the cargo compartment. In some instances, the number of light sources within the lamp assembly may be reduced when compared to other lamp assemblies currently on the market. Thus, the lamp assembly may be manufactured at low costs when compared to standard vehicle lighting assemblies.

According to various examples, a vehicle lamp assembly is provided herein. The vehicle lamp assembly includes a lens operably coupled with a substrate. A light source is disposed between the lens and the substrate. A first optic is disposed on the lens and configured to direct light emitted from the light source in a downward direction. A second optic is disposed on the first optic and is configured to disperse light emitted from the light source. Examples of the vehicle lamp assembly can include any one or a combination of the following features:

- the substrate forms an interior trim member, the trim member defining a cavity and the lens disposed within the cavity;
- the lens is a total internal reflection lens;
- the total internal reflection lens includes a body having a refraction-collimating portion on a rear portion of the body, a total reflection portion outwardly of the refraction-collimating portion, and an emitting surface on a forward portion of the body;
- the first optic is a wedge lens having an upper curved surface and a planar bottom surface;
- the upper curved surface includes a first end portion that terminates at an emitting surface of the lens and a second end portion that is separated from the emitting surface;
- the body defines a longitudinal and a latitudinal axis and the latitudinal axis is offset from a floor surface of a cargo compartment;
- the planar bottom surface of the first optic is parallel to a latitudinal axis of the body;
- the second optic is configured as a pillow lens;
- the lens is formed through an extrusion process;
- the trim member defines a cavity and the lens is at least partially disposed within the cavity; and/or
- the lens at least partially extends outwardly of the cavity.

Moreover, a method of manufacturing a vehicle lamp assembly is provided herein. The method includes extruding a lens having a first optic disposed on the lens and configured to direct light emitted from the light source in a downward direction and a second optic disposed on the first optic and configured to disperse light emitted from the light source. The method also includes operably coupling the lens with a substrate. Lastly, the method includes disposing a light source between the lens and the substrate.

According to some examples, a vehicle lamp assembly is provided herein. The vehicle lamp assembly includes a lens operably coupled with a substrate and defining a latitudinal axis offset from a floor surface of a cargo compartment. A light source is disposed between the lens and the substrate. A first optic is disposed on the lens and is configured to direct light emitted from the light source in a downward direction. Examples of the vehicle lamp assembly can include any one or a combination of the following features:

- the first optic is a wedge lens having an upper curved surface and a planar bottom surface;
- a second optic disposed on the first optic, wherein the second optic is configured as a pillow lens; and/or
- the lens is a total internal reflection lens that includes a body having a refraction-collimating portion on a rear portion of the body, a total reflection portion outwardly of the refraction-collimating portion, and an emitting surface on a forward portion of the body.

According to other examples, a vehicle lamp assembly is provided herein. The vehicle lamp assembly includes a substrate defining a cavity. A lens is positioned at least partially within the cavity. A light source is disposed between the lens and the substrate. A first optic is disposed on the lens and is configured to direct light emitted from the light source in a downward direction. Examples of the vehicle lamp assembly can include any one or a combination of the following features:
- a controller operably coupled with the light source; and a switch assembly operably coupled with the controller;
- a second optic disposed on the first optic; and/or
- the lens is a total internal reflection lens that includes a body having a refraction-collimating portion on a rear portion of the body, a total reflection portion outwardly of the refraction-collimating portion, and an emitting surface on a forward portion of the body.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor and/or switch examples discussed above might include computer hardware, software, firmware, or any combination thereof to perform at least a portion of their functions. For example, a sensor and/or switch may include computer code configured to be executed in one or more processors, and may include hardware logic/electrical circuitry controlled by the computer code. These example devices are provided herein for purposes of illustration, and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle lamp assembly comprising:
   a lens operably coupled with a substrate;
   a light source disposed between the lens and the substrate;
   a first optic disposed on the lens and configured to direct light emitted from the light source in a downward direction; and
   a second optic disposed on the first optic and configured to disperse the downwardly directed light.

2. The vehicle lamp assembly of claim 1, wherein the substrate forms an interior trim member, the trim member defining a cavity and the lens disposed within the cavity.

3. The vehicle lamp assembly of claim 1, wherein the lens is a total internal reflection lens.

4. The vehicle lamp assembly of claim 3, wherein the total internal reflection lens includes a body having a refraction-collimating portion on a rear portion of the body, a total reflection portion outwardly of the refraction-collimating portion, and an emitting surface on a forward portion of the body.

5. The vehicle lamp assembly of claim 4, wherein the first optic is a wedge lens disposed on the emitting surface of the total internal reflection lens and having an upper curved surface and a planar bottom surface.

6. The vehicle lamp assembly of claim 5, wherein the upper curved surface includes a first end portion that terminates at the emitting surface of the total internal reflection lens and a second end portion that is separated from the emitting surface.

7. The vehicle lamp assembly of claim 4, wherein the body defines a longitudinal and a latitudinal axis and the latitudinal axis is offset from a floor surface of a cargo compartment.

8. The vehicle lamp assembly of claim 5, wherein the planar bottom surface of the first optic is parallel to a latitudinal axis of the body.

9. The vehicle lamp assembly of claim 1, wherein the second optic is configured as a pillow lens.

10. The vehicle lamp assembly of claim 1, wherein the lens is formed through an extrusion process.

11. The vehicle lamp assembly of claim 2, wherein the trim member defines a cavity and the lens is at least partially disposed within the cavity.

12. The vehicle lamp assembly of claim 11, wherein the lens at least partially extends outwardly of the cavity.

13. A vehicle lamp assembly comprising:
   a lens operably coupled with a substrate and defining a latitudinal axis that extends through an emitting surface of the lens and is offset from a floor surface of a cargo compartment;
   a light source disposed between the lens and the substrate; and
   a first optic disposed on the emitting surface of the lens and having an upper curved surface and a planar bottom surface, the upper curved surface having a first end portion that terminates at the emitting surface of the lens and a second end portion that is separated from the emitting surface by the planar bottom surface, wherein the first optic is configured to direct light emitted from the light source in a downward direction.

14. The vehicle lamp assembly of claim 13, further comprising:
   a second optic disposed on the first optic, wherein the second optic is configured as a pillow lens.

15. The vehicle lamp assembly of claim 13, wherein the lens is a total internal reflection lens that includes a body having a refraction-collimating portion on a rear portion of the body, a total reflection portion outwardly of the refraction-collimating portion, and the emitting surface on a forward portion of the body.

16. A vehicle lamp assembly comprising:
- a substrate defining a cavity;
- a total internal reflection lens positioned at least partially within the cavity, the total internal reflection lens including a body having a refraction-collimating portion on a rear portion of the body, a total reflection portion outwardly of the refraction-collimating portion, and an emitting surface on a forward portion of the body;
- a light source disposed between the lens and the substrate;
- a first optic disposed on the emitting surface of the lens and configured to direct light emitted from the light source in a downward direction; and
- a second optic disposed on the first optic and configured to disperse the downwardly directed light.

17. The vehicle lamp assembly of claim 16, further comprising:
- a controller operably coupled with the light source; and
- a switch assembly operably coupled with the controller.

* * * * *